(12) United States Patent
Schaff et al.

(10) Patent No.: US 8,210,803 B2
(45) Date of Patent: Jul. 3, 2012

(54) CERAMIC MATRIX COMPOSITE TURBINE ENGINE VANE

(75) Inventors: Jeffery R. Schaff, Vernon, CT (US); Jun Shi, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1403 days.

(21) Appl. No.: 11/824,173

(22) Filed: Jun. 28, 2007

(65) Prior Publication Data

US 2010/0021290 A1    Jan. 28, 2010

(51) Int. Cl.
*F04D 29/54* (2006.01)
*F04D 29/58* (2006.01)
(52) U.S. Cl. ........................................... 415/200
(58) Field of Classification Search .............. 415/177, 415/200, 210.1; 416/224, 230, 241 B
See application file for complete search history.

(56) References Cited

U.S. PATENT DOCUMENTS

| | | | |
|---|---|---|---|
| 5,279,111 A | 1/1994 | Bell et al. | |
| 5,356,265 A | 10/1994 | Kercher | |
| 5,630,700 A | 5/1997 | Olsen et al. | |
| 6,280,550 B1 * | 8/2001 | Steibel et al. | 156/182 |
| 6,283,708 B1 | 9/2001 | Zelesky | |
| 6,331,217 B1 | 12/2001 | Burke et al. | |
| 6,393,331 B1 | 5/2002 | Chetta et al. | |
| 6,464,456 B2 | 10/2002 | Darolia et al. | |
| 6,514,046 B1 | 2/2003 | Morrison et al. | |
| 6,648,597 B1 | 11/2003 | Widrig et al. | |
| 6,709,230 B2 | 3/2004 | Morrison et al. | |
| 7,223,465 B2 * | 5/2007 | Subramanian et al. | 428/293.4 |
| 7,258,530 B2 * | 8/2007 | Morrison et al. | 416/232 |
| 7,754,126 B2 * | 7/2010 | Subramanian et al. | 264/258 |
| 2004/0253096 A1 | 12/2004 | Legg | |
| 2005/0076504 A1 | 4/2005 | Morrison et al. | |
| 2005/0158171 A1 | 7/2005 | Carper et al. | |
| 2009/0028697 A1 * | 1/2009 | Shi et al. | 415/200 |

FOREIGN PATENT DOCUMENTS

EP    1367223 A2    12/2003

OTHER PUBLICATIONS

European Search Report for EP08250494.5, dated Feb. 19, 2009.

* cited by examiner

*Primary Examiner* — Nathaniel Wiehe
(74) *Attorney, Agent, or Firm* — Bachman & LaPointe, P.C.

(57) ABSTRACT

A vane has an airfoil shell and a spar within the shell. The vane has an outboard shroud at an outboard end of the shell and an inboard platform at an inboard end of the shell. The shell includes a region having a coefficient of thermal expansion (CTE) varying with depth.

21 Claims, 7 Drawing Sheets

FIG.8

CERAMIC MATRIX COMPOSITE TURBINE ENGINE VANE

U.S. GOVERNMENT RIGHTS

The invention was made with U.S. Government support under contract NAS3-01138 awarded by NASA. The U.S. Government has certain rights in the invention.

BACKGROUND

The disclosure relates to turbine engines. More particularly, the disclosure relates to turbine engine vanes, for example ceramic matrix composite (CMC) vanes.

CMCs have been proposed for the cooled stationary vanes of gas turbine engines. One example is found in U.S. Pat. No. 6,514,046 of Morrision et al.

The high thermal loading on the vanes results in configurations with thin shells to minimize thermal stress, in particular, inter-laminar tensile stress. The thin shell works well to control the thermal stress, but it also leads to high mechanical stress resulting from the pressure differential between the shell interior and the external gas flow.

Whereas the external hot gas pressure drops sharply from the leading edge to the trailing edge, the internal cooling air pressures stay nearly constant. This creates a large pressure difference through the shell. The pressure difference causes the shell to bulge, especially on the suction side. The pressure difference causes both inter-laminar tensile stress and axial stress. These stresses may exceed design maxima, particularly, at the leading edge.

One mechanism for strengthening the shell involves spanwise tensile ribs or webs that connect the pressure side and suction side of the shell. These ribs help to carry part of the pressure loading and prevent the vane from bulging. Although they can be easily provided in all-metal vanes, manufacturing CMC ribs as integral parts of the shell is difficult. Furthermore, high tensile stress is likely to develop between the relatively cold ribs and hot shells, making such a construction less feasible.

To improve the resistance to mechanical loading, the shell thickness can be increased. This, unfortunately, drives up the thermal stress. Therefore there is an optimal wall thickness that gives the lowest combined stress. For highly loaded vanes, the stress could still be above design limits and other means to control the stress is necessary.

Yet another way to lower the stress is by increasing the smallest bend radius at the leading edge. A larger bend radius would reduce stress concentration factor and thus lower the stress. However, the external airfoil profile is optimized for best aerodynamic performance and could be highly sensitive to any changes. As a result, only the internal radius can be increased and the available amount of stress reduction is limited. Therefore, what is needed is a CMC vane having lower stresses therein.

SUMMARY

One aspect of the disclosure involves a vane having an airfoil shell and a spar within the shell. The vane has an outboard shroud at an outboard end of the shell and an inboard platform at an inboard end of the shell. The shell includes a region having a coefficient of thermal expansion varying with depth.

The details of one or more embodiments are set forth in the accompanying drawings and the description below.

BRIEF DESCRIPTION OF THE DRAWINGS

Like reference numbers and designations in the various drawings indicate like elements.

DETAILED DESCRIPTION

Figure 1:
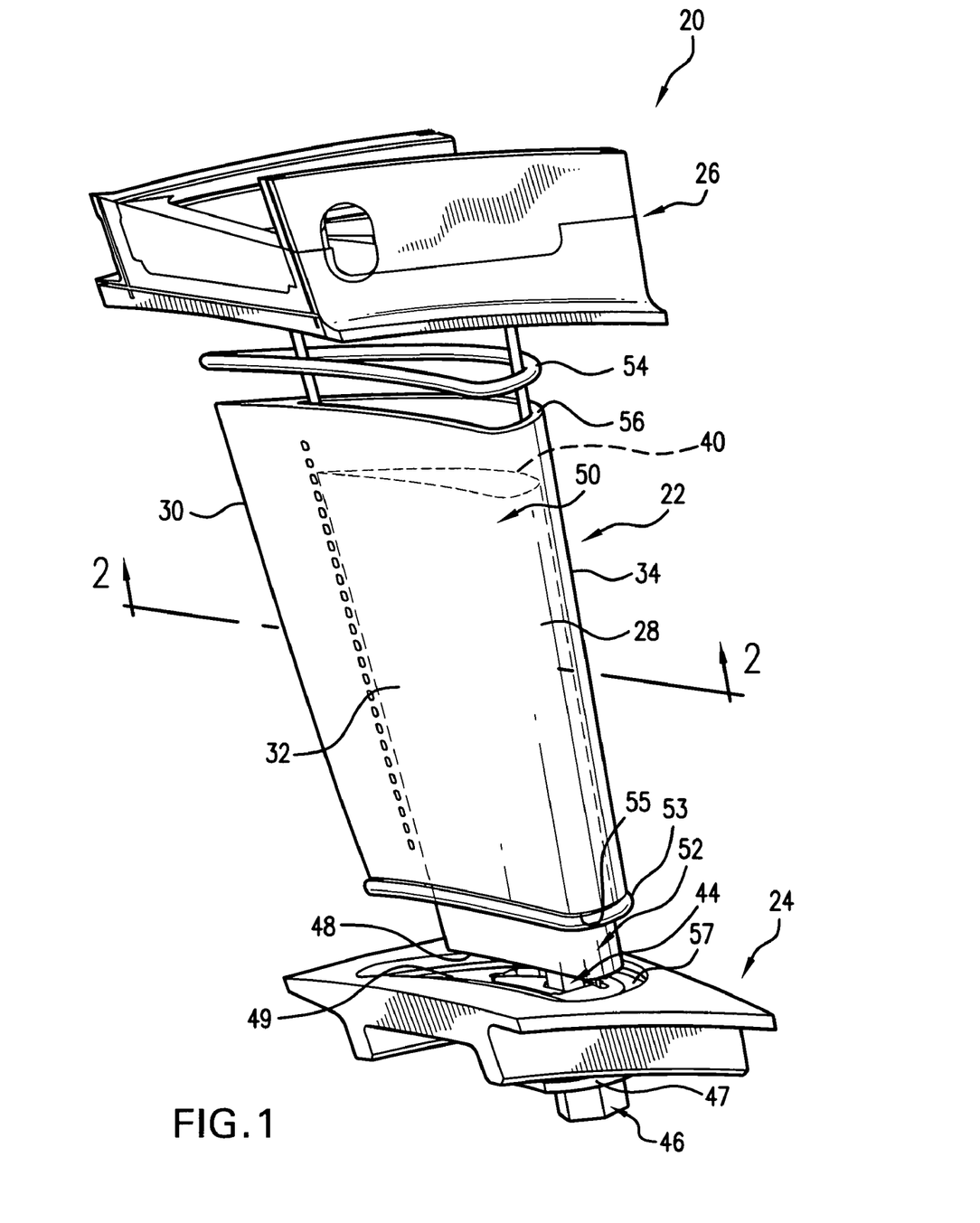
FIG. 1 is a view of a turbine vane.

FIG. 1 shows a vane 20 having an airfoil 22 extending from an inboard end at an inboard platform 24 to an outboard end at an outboard shroud 26. The airfoil 22 has a leading edge 28, a trailing edge 30, and pressure and suction side surfaces 32 and 34 extending between the leading and trailing edges. The exemplary platform and shroud form segments of an annulus so that a circumferential array of such vanes may be assembled with shrouds and platforms sealed/mated edge-to-edge.

Figures 2, 3:
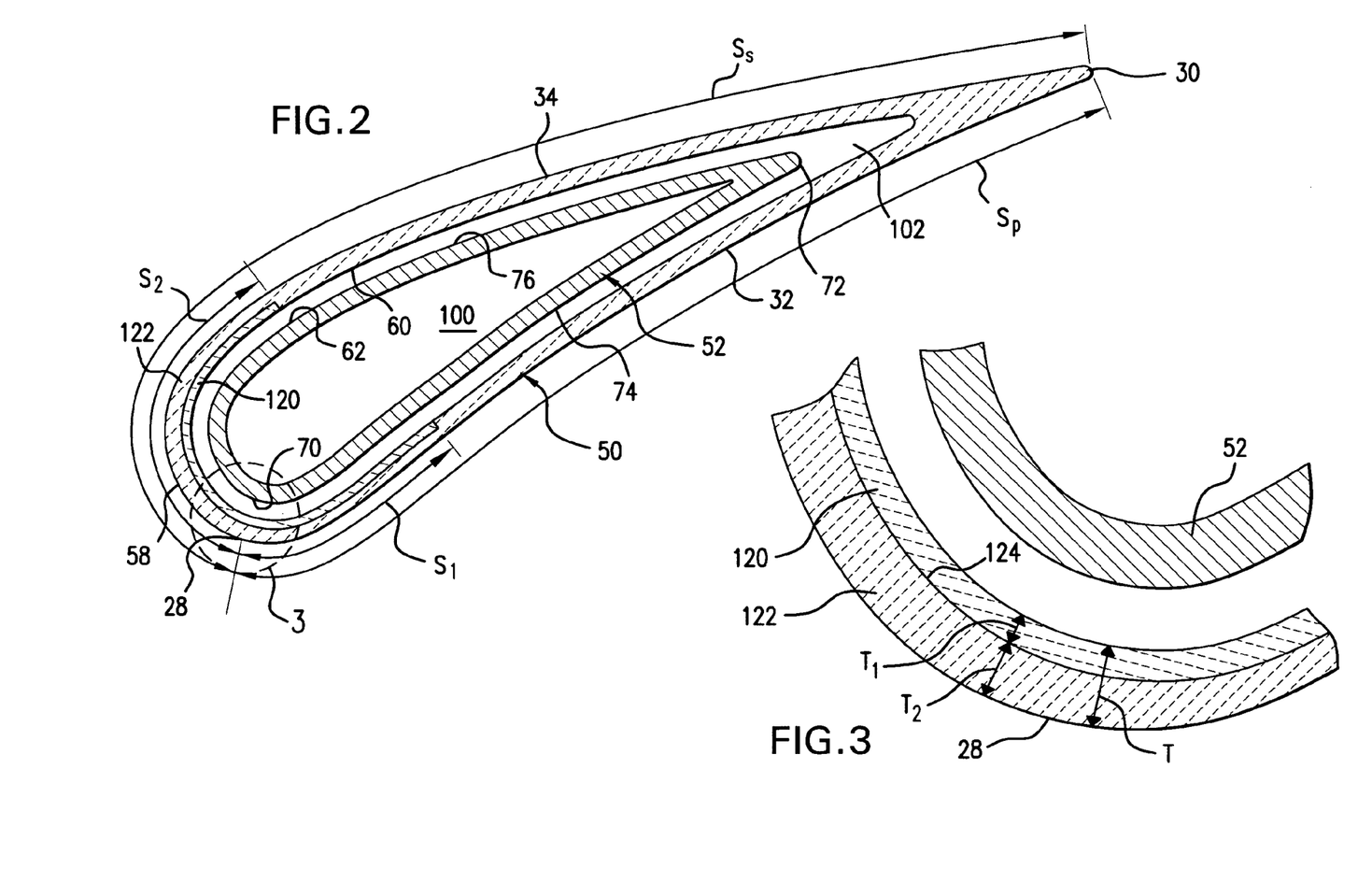
FIG. 2 is a streamwise sectional view of an airfoil of the vane of FIG. 1.
FIG. 3 is an enlarged view of the leading edge area of the airfoil of FIG. 2.

The exemplary vane 20 is an assembly wherein the shroud, platform, and airfoil are separately formed and then secured to each other. FIGS. 1-3 show the airfoil as comprising a thin-walled shell 50 and a structural spar 52 within the shell. Exemplary shell material may be a composite (e.g., a ceramic matrix composite (CMC)). The shell may be manufactured by various CMC fabrication methods. These may involve forming a preform of ceramic fiber (e.g., SiC) in the shape of the airfoil (e.g., by weaving or other technique) and infiltrating the preform with matrix material (e.g., also SiC). Prior to infiltration, the preform may be coated for limiting bonding with the matrix (e.g., with BN by chemical vapor deposition (CVD)). Exemplary infiltration techniques may include chemical vapor infiltration, slurry infiltration-sintering, polymer-impregnation-pyrolysis, slurry casting, and melt infiltration.

Exemplary spar material may be a metal alloy (e.g., a cast nickel-based superalloy). Inboard and outboard seals 53 and 54 may respectively seal between inboard and outboard ends 55 and 56 of the shell and the adjacent platform and shroud.

An outboard end portion 40 of the spar 52 may be mounted to the shroud 26. For example, the portion 40 may be received in an aperture in the shroud and welded thereto. A threaded stud 44 may be formed at the inboard end of the spar 52 and extend through an aperture in the platform 24. A nut 46 and washer(s) 47 may engage the stud and an inboard surface of the platform while a shoulder 48 of the spar may bear against a mating shoulder 49 of the platform. The spar may thus form the principal mechanical coupling between shroud and platform.

The shell may be positioned relative to the spar by one or more of several mechanisms. The shell inboard and outboard ends 55 and 56 may be located by appropriate channels 57 in the platform and shroud, respectively. Additionally, spacers or seal/spacer units such as seals 53 and 54 may be positioned between the spar and the shell.

The shell exterior surface 58 (FIG. 2) defines the leading and trailing edges 28 and 30 and pressure and suction sides 32 and 34. The shell interior surface 60 includes a first portion along the pressure side and a second portion along the suction side. These may define adjacent pressure and suction sidewall portions, which may directly merge at the leading edge and merge more gradually toward the trailing edge.

The spar 52 has an exterior surface 62 which may be in close facing spaced-apart relation to the shell interior surface. Thus, the spar exterior surface may have a leading edge 70, a trailing edge 72, and pressure and suction side portions 74 and 76. One or more seals may extend generally spanwise between the spar exterior surface 62 and shell interior surface 60.

The shell interior surface may be cooled. Exemplary cooling air may be delivered through one or more passageways 100 in the spar. The cooling air may be introduced to the passageways 100 via one or more ports in the shroud and/or platform. The cooling air may pass through apertures (not shown) in the shroud to one or more spaces 102 between the spar exterior surface and shell interior surface. Accordingly, the shell interior surface may typically be cooler than the adjacent shell exterior surface. The depth-wise temperature difference and thermal gradient may vary along the shell. Aerodynamic heating near the leading edge may make the difference and gradient particularly high near the leading edge. If the shell is of uniform coefficient of thermal expansion (CTE), a local temperature difference may cause an exterior portion of the shell to seek to expand more than an interior portion. This may cause an undesirable stress distribution (e.g., with tensile stresses occurring near the interior surface and compressive stresses near the exterior surface and associated shear distributions). The relatively tight radius of curvature near the leading edge may exacerbate this problem.

The stress distributions may be ameliorated by providing an at least local depth-wise variation in CTE. FIGS. 2 and 3 show a basic implementation wherein the shell is formed with two discrete depth-wise layers/regions 120 and 122 along a leading edge region. The region 120 is of a higher CTE than the region 122. In the exemplary implementation, the region 122 is of the same composition/properties as a remainder of the shell. Other variations are possible.

The difference in CTE between the regions 120 and 122 may be achieved by various means. This may involve one or more of differences in: matrix material; fiber composition (e.g., chemical composition); fiber structure (e.g., fiber diameter); and fiber arrangement (e.g., orientation, weave structure, and the like). The CTEs of the different regions may be isotropic or anisotropic. Additionally, the depth-wise variation may be an isotropic variation or an anisotropic variation.

FIG. 3 shows a local thickness T of the shell. A boundary 124 between the regions 120 and 122 is positioned such that the region 120 has a thickness $T_1$ and the region 122 has a thickness $T_2$. The relative CTEs of the regions 120 and 122 and the location of the boundary 124 may be selected so as to minimize peak, stresses (e.g., tensile stress) under anticipated conditions (e.g., normal operating conditions or an anticipated range of abnormal operating conditions).

The greater CTE of the region 120 may cause it to expand more than if it were of the same CTE as the region 122. This difference in thermal expansion may at least partially compensate for the depth-wise difference in temperature. An exemplary characteristic CTE of the region 120 is 105-120% of the characteristic CTE of the region 122, more narrowly, 105-110%. In the example, the region 120 extends a streamwise distance $S_1$ along the pressure side. This may be a portion of the total pressure side streamwise distance $S_P$. Similarly, the region 120 extends a streamwise distance $S_2$ along the suction side which may be a portion of the total suction size streamwise distance $S_S$. Exemplary $S_1$ is 5-30% of $S_P$, more narrowly, 5-10%. Exemplary $S_2$ is 5-30% of $S_S$, more narrowly, 5-10%. In the pure two-layer configuration, exemplary ratios of $T_1$ to $T_2$ are 40-60%.

The example above involves an application where the stress-free temperature for the baseline uniform shell is below the actual use temperature. If the stress-free temperature is above the actual use temperature, then the region 120 would have a lower CTE than the region 122.

More generally than the pure two-layer situation, there may be other layers (e.g., transitions and layers for special purposes), CTE gradients within layers, and the like. Accordingly, the CTE differences amongst regions may be characterized in terms of averages (e.g., mean, median, or modal values) and the identified regions may, in combination, represent only portions of the total local wall/shell thickness. For example, one may characterize the identified regions as each representing at least 20% of a local shell thickness/depth, more narrowly 30% or 40%.

Figure 4:
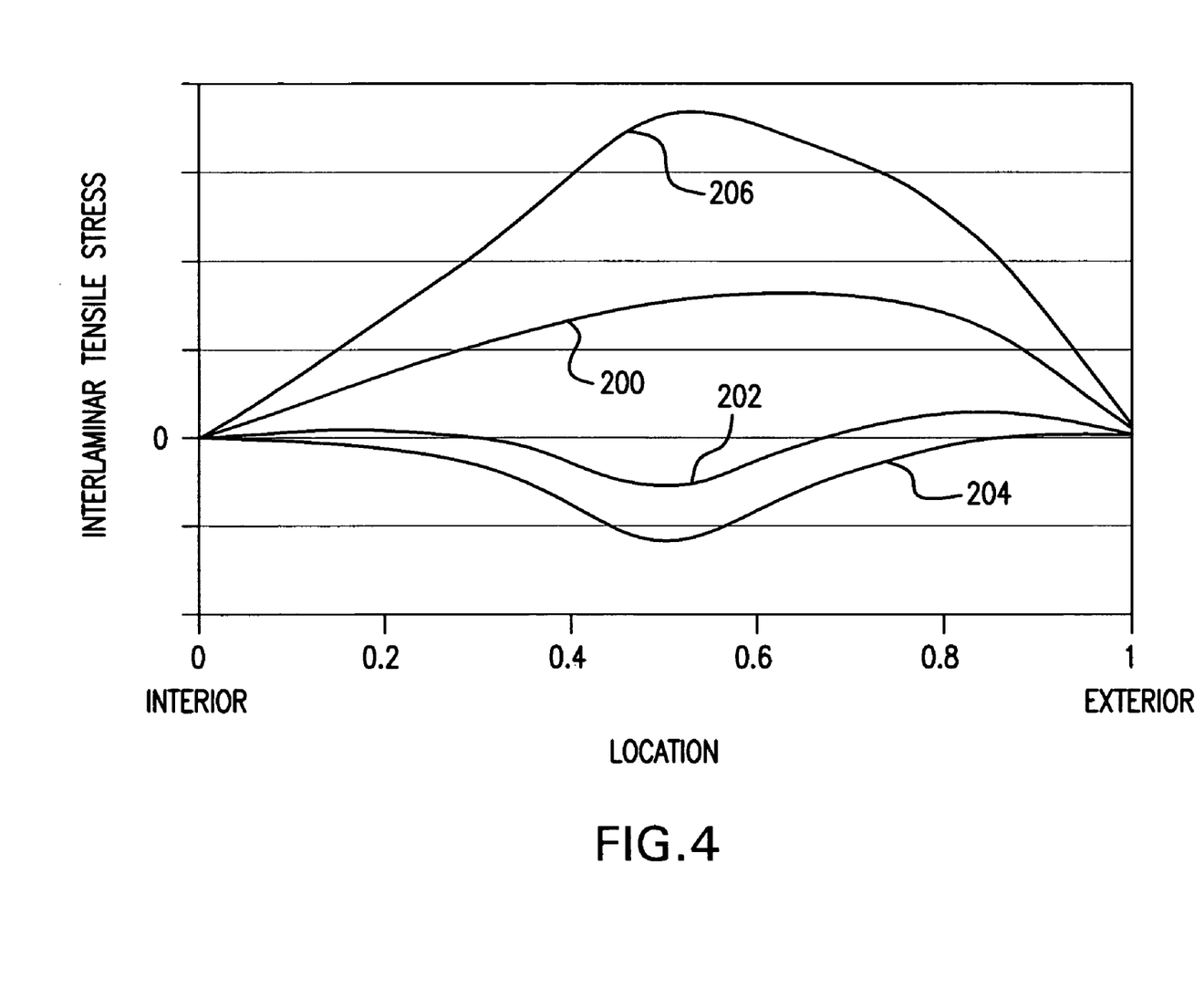
FIG. 4 is a graph of interlaminar tensile stress (ILT) against depth-wise location for airfoil shells.
Figure 5:
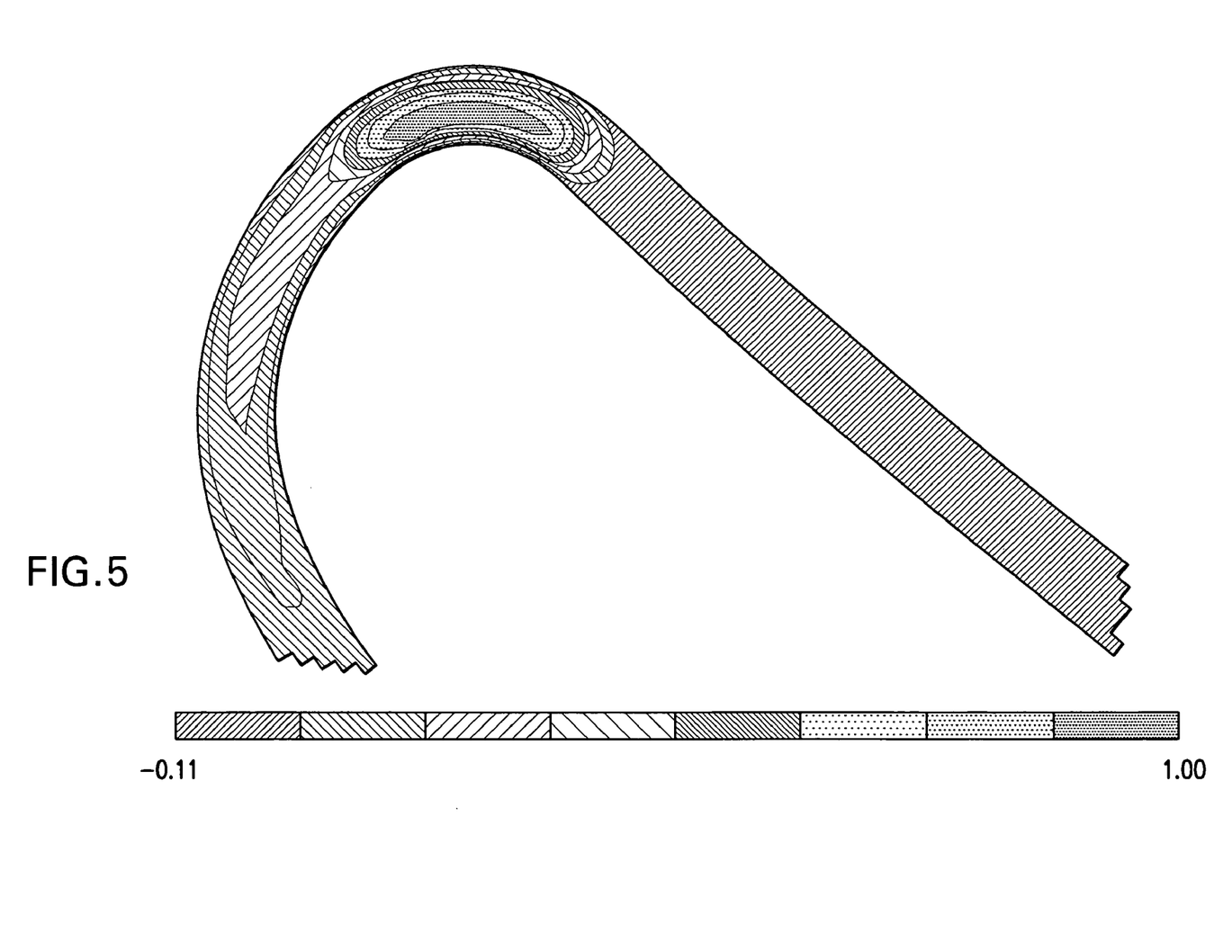
FIG. 5 is a plot of interlaminar tensile stress for a baseline shell.
Figure 6:
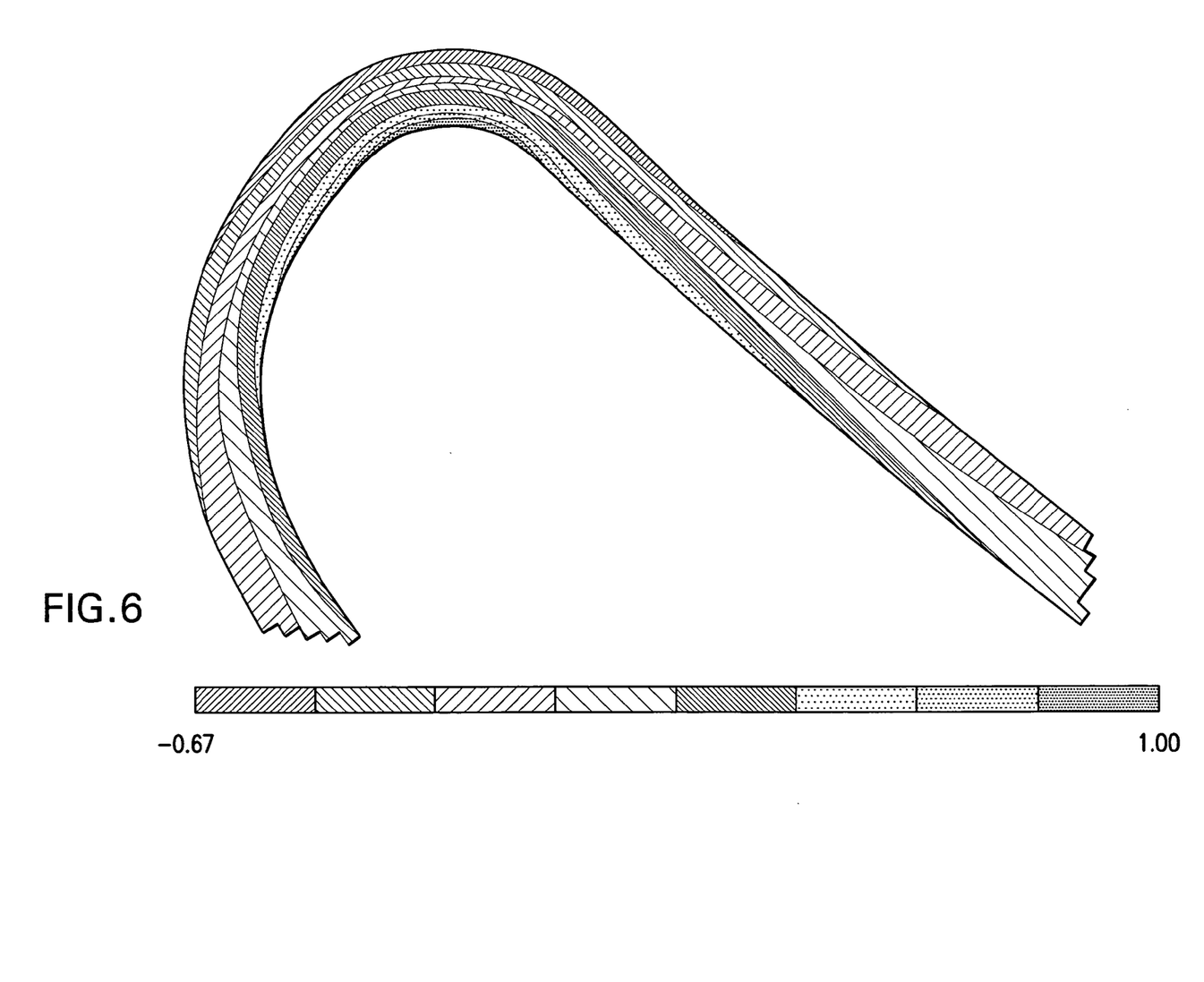
FIG. 6 is a plot of axial stress for the baseline shell.
Figure 7:
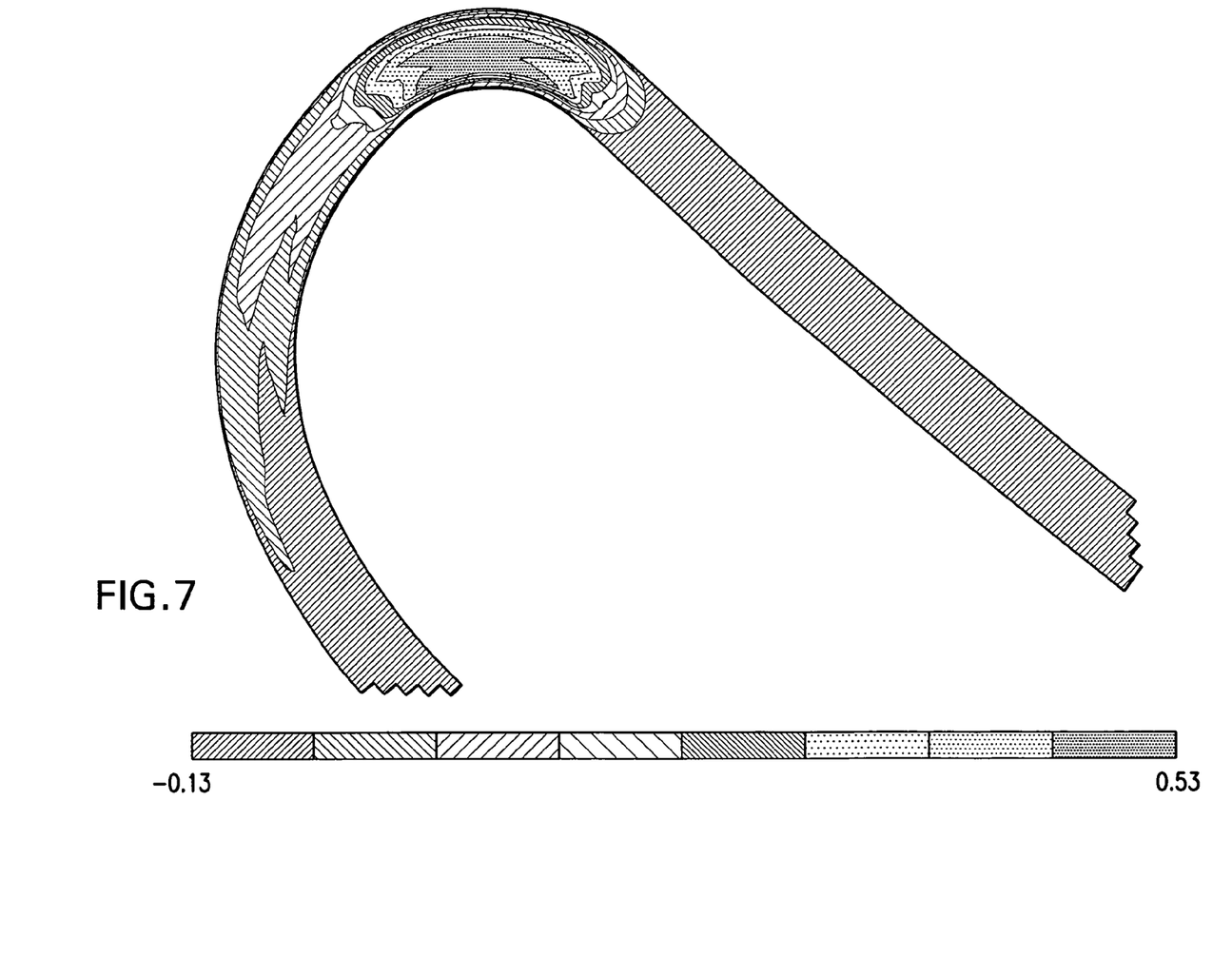
FIG. 7 is a plot of interlaminar tensile stress for the shell of the airfoil of FIG. 2.
Figure 8:
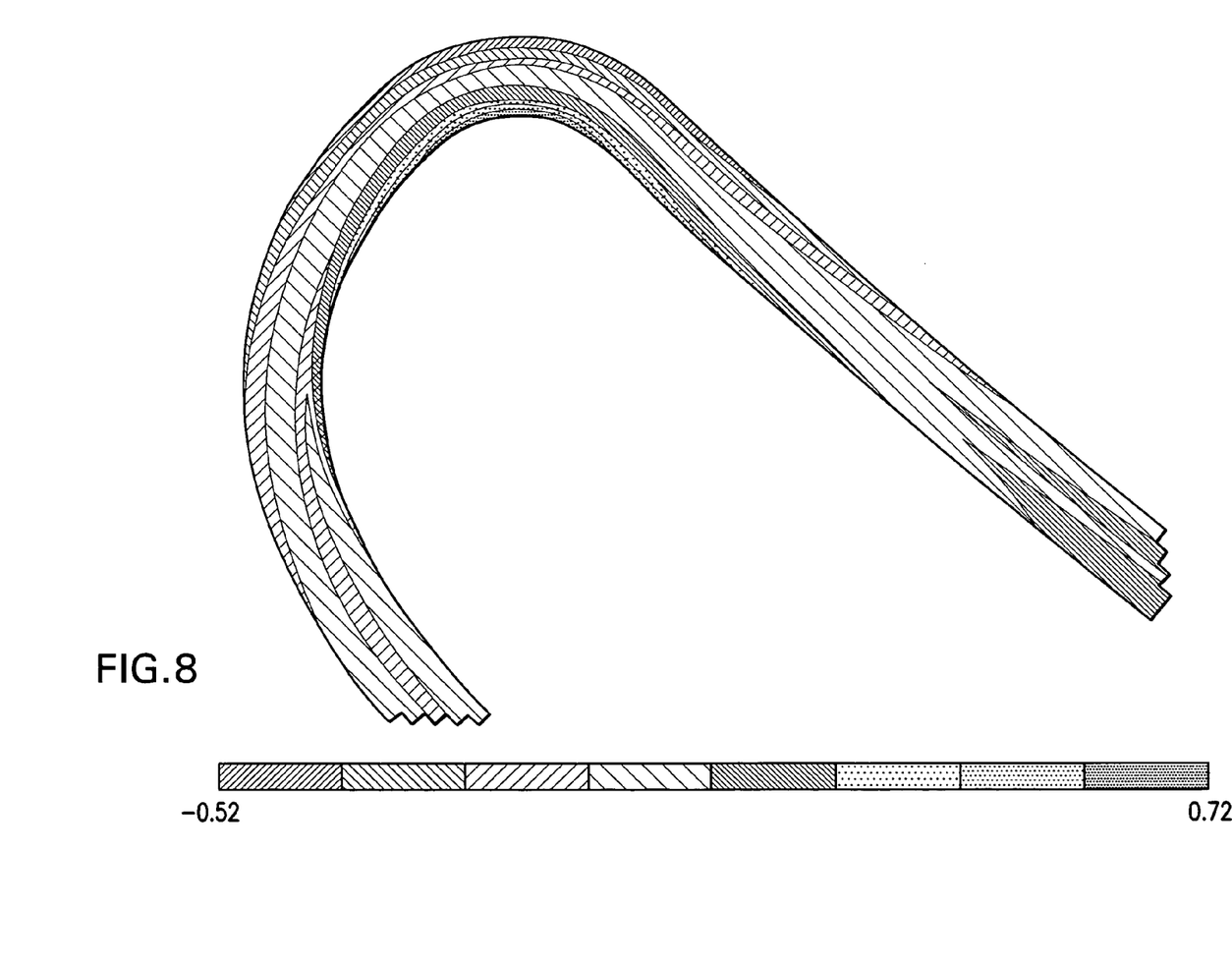
FIG. 8 is a plot of axial stress for the shell of the airfoil of FIG. 2.

FIG. 4 shows a plot 200 of interlaminar tensile stress (ILT) against depth-wise location for a baseline shell of uniform CTE. Additional plots show the ILT for two-layer systems. The plots were generated by finite element analysis software, with the two-layer plots reflecting equal layer thickness. The analysis utilized a baseline vane shape from a commercial aircraft engine and a baseline operating condition (temperature gradient) for that baseline vane. The plot 202 reflects a CTE ratio of the region 120 to the region 122 of 1.1:1. Maximum tensile stress is reduced by more than 75%. A compressive stress is created near the interface. Plot 204 reflects a ratio of 1.2:1. Peak leading edge tensile stress is reduced to essentially zero. For reference and by way of contrast, plot 206 reflects a ratio of 0.9:1. With such a ratio, the peak tensile stress is more than doubled.

FIGS. 5-8 show ILT (FIGS. 5 and 7) and axial stress (FIGS. 6 and 8) for a baseline shell and a reengineered shell (having a CTE ratio of the region 120 to the region 122 of 1.1:1), respectively. The stresses are normalized to the peak positive stress of the baseline. The simulated conditions differed from those of FIG. 4, but also produced substantial stress reduction. Peak positive ILT is reduced by nearly 50% with a small (in relative terms—very small in absolute terms) increase in the magnitude of peak negative ILT. Peak positive axial stress is reduced by almost 30%, with no increase in the magnitude of negative axial stress (a moderate relative reduction).

Such a vane may be implemented in the reengineering of a given baseline vane. In an exemplary reengineering, the reengineering may preserve the basic external profile of the shell of the baseline vane. The reengineering may also preserve the internal profile. However, internal changes including local or general wall thinning may be particularly appropriate in view of the available stress reduction (e.g., a leading edge thinning at one or more locations along a leading tenth of the shell). In this vein, the reengineering may also eliminate or reduce other internal strengthening features such as tensile ribs/webs, locally thickened areas, and the like. The reengineering may also alter the spar structure. The reengineered vane may be used in the remanufacturing of a given gas turbine engine. Exemplary peak positive ILT reduction may be at least 20% without increasing axial stress, more narrowly at least 30% with a 20% axial stress reduction.

One or more embodiments have been described. Nevertheless, it will be understood that various modifications may be made. For example, when implemented as a reengineering of an existing vane configuration (e.g., as part of a remanufacturing of an engine or reengineering of the engine configuration) details of the baseline engine configuration or vane configuration may influence details of any particular implementation. Accordingly, other embodiments are within the scope of the following claims.

What is claimed is:

1. A vane comprising:
an airfoil shell having:
a leading edge;
a trailing edge;
a pressure side; and
a suction side;
a spar within the shell;
an outboard shroud at an outboard end of the shell; and
an inboard platform at an inboard end of the shell,
wherein the shell comprises:
a region having a coefficient of thermal expansion varying with depth; and
along said region there is a first zone of at least 20% of a local depth and a second zone of at least 20% of the local depth and outboard of the first zone, the first zone having a characteristic coefficient of thermal expansion at least 105% of a characteristic coefficient of thermal expansion of the second zone.

2. The vane of claim 1 wherein:
the airfoil shell consists essentially of a ceramic matrix composite;
the spar consists essentially of a first metallic casting;
the platform consists essentially of a second metallic casting; and
the shroud consists essentially of a third metallic casting.

3. The vane of claim 1 wherein:
the shell lacks tensile webs connecting the shell pressure and suction sides.

4. The vane of claim 1 wherein:
said characteristic coefficient of thermal expansion of the first zone is at least 105% of said characteristic coefficient of thermal expansion of the second zone in all of mean, median, and mode.

5. The vane of claim 1 wherein:
said characteristic coefficient of thermal expansion of the first zone is at least 105% of said characteristic coefficient of thermal expansion of the second zone in both of mean and mode.

6. The vane of claim 1 wherein:
the region includes the leading edge.

7. The vane of claim 6 wherein:
the region extends at least 5% of a streamwise distance from the leading edge to the trailing edge along the suction side; and
the region extends at least 5% of a streamwise distance from the leading edge to the trailing edge along the pressure side.

8. The vane of claim 6 wherein:
the region extends 10-70% of a streamwise distance $S_S$ from the leading edge to the trailing edge along the suction side; and
the region extends 10-70% of a streamwise distance $S_P$ from the leading edge to the trailing edge along the pressure side.

9. The vane of claim 1 wherein:
the first zone has substantially uniform properties; and
the second zone has substantially uniform properties, the first and second zones having a combined at least 70% of a local depth.

10. A method of manufacturing the vane of claim 1 comprising:
casting the shroud;
casting the platform;
casting the spar; and
ceramic matrix infiltration of a ceramic fiber preform to form the shell.

11. The method of claim 10 further comprising:
forming the preform by braiding and filament winding of ceramic fibers of different coefficients of thermal expansion.

12. The method of claim 10 wherein:
the infiltration comprises infiltrating the preform with at least two different matrix materials.

13. The vane of claim 1 wherein:
the shell is a CMC; and
the spar is metallic.

14. A method for engineering a vane having:
an airfoil shell having:
a leading edge;
a trailing edge;
a pressure side; and
a suction side;
a spar within the shell;
an outboard shroud at an outboard end of the shell; and
an inboard platform at an inboard end of the shell,
the method comprising:
providing a shell configuration having a depth variation in a coefficient of thermal expansion along a region; and
determining a thermal-mechanical stress profile, the method being a reengineering from a baseline configuration to a reengineered configuration wherein:
an external sectional shape of the shell is preserved from the baseline.

15. The method of claim 14 wherein:
the providing and determining are iteratively performed as a simulation.

16. The method of claim 14 wherein:
operational extreme magnitudes of positive axial stress and positive interlaminar tensile stress are both reduced from the baseline configuration to the reengineered configuration.

17. The method of claim 14 wherein:
an operational extreme magnitude of positive interlaminar tensile stress is reduced from the baseline configuration to the reengineered configuration by at least 20% without increasing an operational extreme magnitude of positive axial stress.

18. The method of claim 14 wherein:
an operational extreme magnitude of positive interlaminar tensile stress is reduced from the baseline configuration to the reengineered configuration by at least 30% and an operational extreme magnitude of positive axial stress is reduced by at least 20%.

19. The method of claim 14 wherein:
the shell is thinned at least at one location along a leading tenth of the shell from the baseline configuration to the reengineered configuration.

20. The method of claim 14 wherein the region is only a local region.

21. The method of claim 14 wherein:
the region extends 10-70% of a streamwise distance $S_S$ from the leading edge to the trailing edge along the suction side; and
the region extends 10-70% of a streamwise distance $S_P$ from the leading edge to the trailing edge along the pressure side.

* * * * *